US009702492B2

(12) United States Patent
Borgmeier et al.

(10) Patent No.: US 9,702,492 B2
(45) Date of Patent: Jul. 11, 2017

(54) LINE CONNECTOR AND LINE SET FOR FLUID MEDIA

(75) Inventors: Olav Borgmeier, Hückeswagen (DE); Frank Peters, Lindlar (DE); Michele Stelluto, Remscheid (DE); Ulrich Hiltemann, Wermelskirchen (DE); Roland Klein, Wipperfürth (DE); Sabine Schuster, Marienheide (DE); Volker Zieris, Burscheid (DE)

(73) Assignee: VOSS AUTOMOTIVE GMBH, Wipperfurth (DE)

(*) Notice: Subject to any disclaimer, the term of this patent is extended or adjusted under 35 U.S.C. 154(b) by 667 days.

(21) Appl. No.: 12/739,088

(22) PCT Filed: Oct. 1, 2008

(86) PCT No.: PCT/EP2008/063158
§ 371 (c)(1), (2), (4) Date: Oct. 28, 2010

(87) PCT Pub. No.: WO2009/053227
PCT Pub. Date: Apr. 30, 2009

(65) Prior Publication Data

US 2011/0241333 A1 Oct. 6, 2011

(30) Foreign Application Priority Data

Oct. 26, 2007 (DE) .................... 20 2007 015 036 U

(51) Int. Cl.
*F16L 39/00* (2006.01)
*F16L 37/56* (2006.01)
(Continued)

(52) U.S. Cl.
CPC ........... *F16L 39/005* (2013.01); *F16L 37/565* (2013.01); *F16L 53/002* (2013.01); *F01N 3/2066* (2013.01);
(Continued)

(58) Field of Classification Search
CPC .............................. F16L 39/005; F16L 37/565
(Continued)

(56) References Cited

U.S. PATENT DOCUMENTS 1,324,967 A * 12/1919 Hoting .................. F16L 39/005 285/121.4
3,932,727 A 1/1976 True
(Continued)

FOREIGN PATENT DOCUMENTS

CA 2 008 633 A1 7/1990
DE 2749098 A1 5/1978
(Continued)

OTHER PUBLICATIONS

PCT/EP2008/063158—International Search Report.

*Primary Examiner* — James M Hewitt
(74) *Attorney, Agent, or Firm* — Eric J. Sosenko; Jonathan P. O'Brien; Honigman Miller Schwartz and Cohn LLP

(57) ABSTRACT

A line connector for a urea-water solution in an SCR catalytic converter system. The line connector has two mutually separate flow paths for two fluid media, one for a functional medium and another for a temperature control medium for controlling the temperature of the functional medium. The line connector includes a connector body having a first connection for a first line conducting a functional medium, a second connection conducting a temperature control medium, and a third connection for a double line having an inner line and a coaxial outer line. The third connection has an inner connecting element with an inner passage and an outer connecting element with an outer passage. The connector body is formed in its interior such
(Continued)

that the first and second connections merge separately from one another into the inner and outer passages, respectively, of the third connection.

8 Claims, 2 Drawing Sheets

(51) Int. Cl.
*F01N 3/20* (2006.01)
*F16L 13/02* (2006.01)
*F16L 53/00* (2006.01)

(52) U.S. Cl.
CPC ...... *F01N 2610/02* (2013.01); *F01N 2610/14* (2013.01); *F16L 13/02* (2013.01); *F16L 53/00* (2013.01)

(58) Field of Classification Search
USPC ........... 285/41, 123.1, 123.3, 123.12, 123.15
See application file for complete search history.

(56) References Cited

U.S. PATENT DOCUMENTS

| | | | | |
|---|---|---|---|---|
| 3,980,112 | A * | 9/1976 | Basham | 141/392 |
| 3,986,732 | A | 10/1976 | Stanley | |
| 4,435,005 | A | 3/1984 | Berger et al. | |
| 4,922,971 | A * | 5/1990 | Grantham | 141/1 |
| 4,995,644 | A * | 2/1991 | Brown et al. | 285/41 |
| 5,285,744 | A * | 2/1994 | Grantham et al. | 141/59 |
| 5,398,977 | A * | 3/1995 | Berger et al. | 285/123.17 |
| 5,628,532 | A * | 5/1997 | Ashcraft | 285/123.15 |
| 5,762,108 | A * | 6/1998 | Hunter | 138/109 |
| 6,086,114 | A * | 7/2000 | Ziu | F16L 39/005 138/113 |
| 6,617,556 | B1 | 9/2003 | Wedel | |
| 2001/0020786 | A1* | 9/2001 | Takamatsu | F16L 39/005 285/123.1 |
| 2003/0034648 | A1* | 2/2003 | Zitkowic et al. | 285/120.1 |
| 2004/0194918 | A1* | 10/2004 | Kato | B60H 1/00571 165/51 |
| 2005/0083638 | A1 | 4/2005 | Warren et al. | |
| 2007/0073286 | A1 | 3/2007 | Panescu et al. | |
| 2007/0176418 | A1 | 8/2007 | Frogneborn et al. | |
| 2007/0241560 | A1* | 10/2007 | Malone | 285/319 |

FOREIGN PATENT DOCUMENTS

| | | | | |
|---|---|---|---|---|
| DE | 2752374 | A1 | 5/1979 | |
| DE | 19510193 | A1 | 9/1996 | |
| DE | 29807763 | U1 | 9/1999 | |
| DE | 198 18 649 | A1 | 10/1999 | |
| DE | 20115436 | U1 | 2/2003 | |
| DE | 20214847 | U1 | 2/2004 | |
| DE | 103 26 894 | B3 | 9/2004 | |
| DE | 20 2005 004 602 | | 7/2005 | |
| DE | 20 2006 003 590 | | 6/2006 | |
| DE | 20200501369 | U1 | 1/2007 | |
| DE | 102006034697 | A1 | 2/2007 | |
| EP | 0 379 635 | A | 8/1990 | |
| EP | 0 764 810 | | 3/1997 | |
| EP | 1 610 049 | A | 12/2005 | |
| EP | 1 698 769 | | 9/2006 | |
| EP | 1 710 484 | | 10/2006 | |
| EP | 1 777 452 | A | 4/2007 | |
| EP | 1553270 | | 7/2007 | |
| EP | 1 818 588 | A1 | 8/2007 | |
| EP | 1985908 | A1 * | 10/2008 | F16L 53/00 |
| FR | 1065308 | | 5/1954 | |
| GB | 2 423 686 | A | 2/2002 | |
| JP | 08152082 | | 6/1996 | |
| JP | 10306889 | | 11/1998 | |
| JP | 2000065266 | | 3/2000 | |
| JP | 2000266261 | | 9/2000 | |
| WO | WO 2005/001322 | A1 | 1/2005 | |
| WO | WO 2005/124219 | A1 | 12/2005 | |
| WO | WO 2007/032034 | A1 | 3/2007 | |
| WO | WO 2007/073286 | A1 | 6/2007 | |
| WO | WO 2009/013342 | A2 | 1/2009 | |

* cited by examiner 18
2
26
4a
4
20
8
16
24
6
1
III
28
6a
6
1
28
4a
4
2
22
18
24
26
8
X
16
20
8a
II
1
4a
6
4
2
28
26

LINE CONNECTOR AND LINE SET FOR FLUID MEDIA

CROSS REFERENCE TO RELATED APPLICATION

This application claims priority to International Application No. PCT/EP2008/063158, filed Oct. 1, 2008, which is based on and claims priority to German Patent Application No. 20 2007 015 036.9, filed Oct. 26, 2007.

FIELD OF THE INVENTION

The present invention relates to a line connector having two mutually separate flow paths for two fluid media, specifically one for a functional medium, in particular for a urea-water solution in an SCR catalytic converter system of a motor vehicle, and another for a temperature control medium for controlling the temperature of the functional medium.

The invention also relates to a line set comprising a line connector of the above mentioned type and at least one connected line.

BACKGROUND OF THE INVENTION

In motor vehicle engineering, in particular in diesel engines, use is made in part of so-called SCR catalytic converters (SCR=selective catalytic reduction), with an aqueous, for example a 32.5% urea solution, being used as a NOx reduction additive. Here, it is a known problem that a urea-water solution of this type, on account of its freezing point of approximately −11° C., requires special measures to prevent freezing in the case of correspondingly low ambient temperatures in order to ensure the function of the SCR catalytic converter even at low ambient temperatures.

EP 1 818 588 A1, for example, thus describes a hose assembly for conducting a urea-water solution, the hose assembly comprising a connector and a hose, with a temperature control means in the form of an electric heat conductor or a second, inner hose for conducting a fluid temperature control medium running coaxially or eccentrically through the cavity of the hose. The temperature control means which runs in the longitudinal direction through the outer hose also runs through the entire connector and, opposite, is guided out of an outlet such that sealing is required in the leadthrough region. A connection of the lines, in particular in the case of the temperature control line, is extremely cumbersome.

The object on which the present invention is based is that of improving a line connector of the type described in the introduction such that it is firstly of simple structural design and can be produced in a simple and economical manner and it secondly ensures good use characteristics, in particular with regard to as simple and fast a connection as possible of the lines required for the two media.

This is achieved according to the invention by means of a line connector as described herein.

BRIEF DESCRIPTION OF THE DRAWINGS

The line connector according to the invention will be explained on the basis of a plurality of exemplary embodiments illustrated in the drawing, in which.

DETAILED DESCRIPTION OF THE INVENTION

Figures 1, 2, 3:
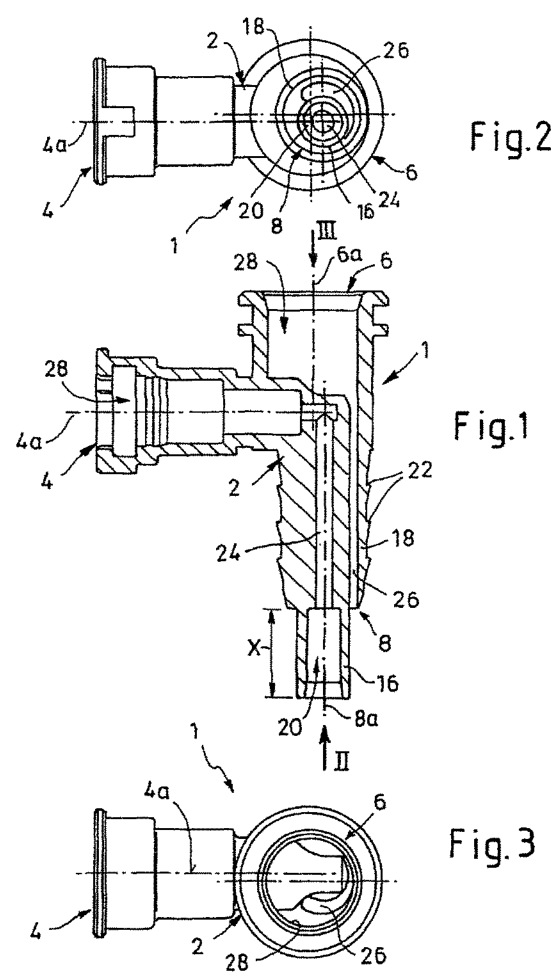
FIG. 1 shows a longitudinal section through a line connector according to the invention in a first embodiment.
FIG. 2 shows a view in the arrow direction II as per FIG. 1.
FIG. 3 shows a view in the arrow direction III as per FIG. 1.

In the different figures of the drawing, identical parts are always provided with the same reference numerals and are therefore generally also described only once in each case.

A line connector 1 according to the invention is used in conjunction with lines for a fluid functional medium which is at risk of freezing, with the functional medium being temperature-controlled, in particular heated, though said functional medium may, if appropriate, also be cooled, by means of a temperature control medium. Here, the line connector 1 serves firstly for conducting the functional medium and secondly for supplying or discharging the temperature control medium, which preferably circulates in a circuit.

In a preferred use of the line connector 1, the functional medium is a urea-water solution in an SCR catalytic converter of a motor vehicle, with it being possible for the engine coolant (cooling water), for example, to be used as temperature control medium.

Figure 4:
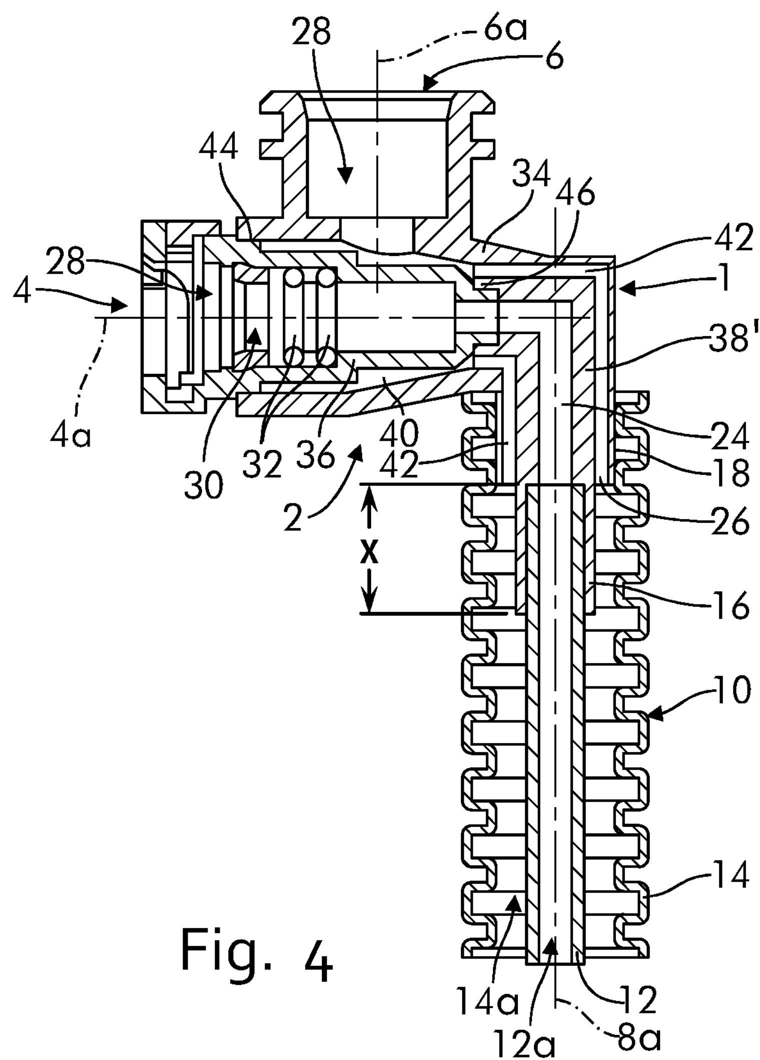
FIG. 4 shows a longitudinal section through a second embodiment of the line connector according to the invention with a connected double line for a functional medium and a temperature control medium.
Figure 5:
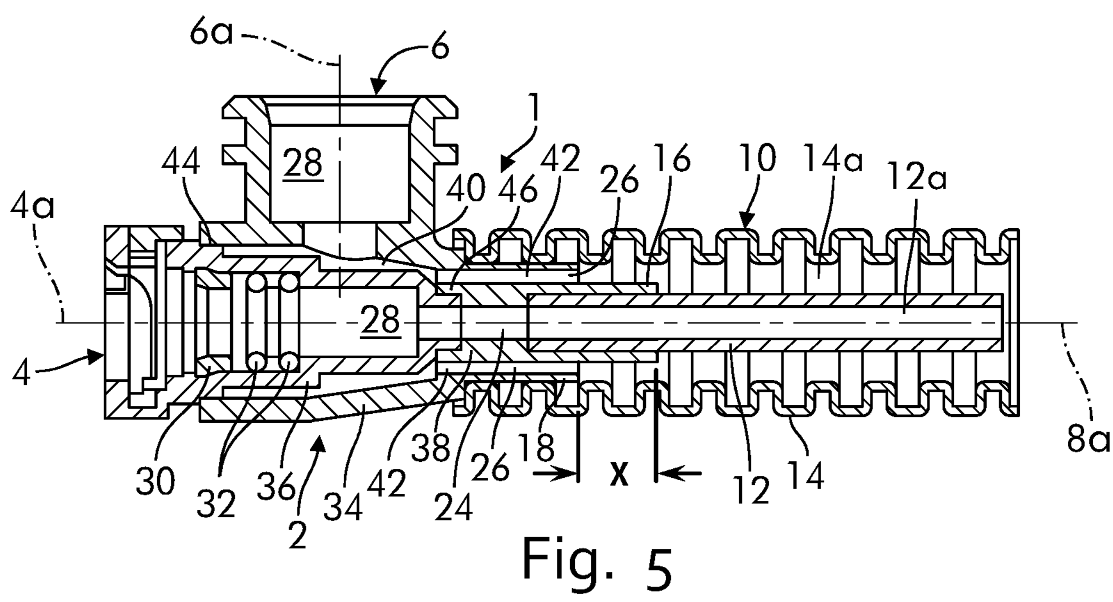
FIG. 5 shows a design variant of FIG. 4 in a corresponding longitudinal sectional illustration.

The line connector 1 according to the invention is composed of a connector body 2 having (at least) three line connections, specifically a first connection 4 for a first line (not illustrated) which conducts the functional medium, a second connection 6 for a second line (likewise not illustrated) which conducts a fluid temperature control medium, and a third connection 8 for a coaxial double line 10 (see FIGS. 4 and 5) which is composed of an inner line 12 and an outer line 14 substantially coaxially surrounding said inner line 12. For this purpose, the third connection 8 is designed in particular as a double connecting piece with an inner connecting piece 16 and an outer connecting piece 18, with it being possible for the connecting pieces 16 and 18 to be arranged coaxially or with a slight parallel offset. The inner connecting piece 16 preferably extends axially beyond the outer connecting piece 18 with a certain projecting length X. The inner connecting piece 16 is expediently formed with a receptacle 20 for plugging in the inner line 12, with it being possible for the line 12 to be fastened preferably cohesively, specifically in particular by means of laser welding, for which purpose the inner connecting piece 16 is composed of a laser-transparent material at least in the region of the receptacle 20 and of the projecting length X. The outer connecting piece 18 is preferably formed in the manner of a conventional hose or pipe connecting piece with an external mandrel profile 22, composed of one or more holding edges, for plugging on the outer line 14. The outer line 14 may, as illustrated by way of example in FIGS. 4 and 5, are formed in the manner of a so-called corrugated pipe. The outer line 14 may fundamentally also, alternatively or additionally, be fastened cohesively, in particular by means of laser welding.

Here, the third connection 8 furthermore has an inner passage 24 in the form of an axial central duct to the transition into the inner connecting piece 16 and a duct 12*a* of the inner line 12 and also an outer passage 26 to the transition into an annular duct 14*a* between the inner line 12 and the outer line 14. The inner passage 24 therefore opens out axially into the receptacle 20 of the inner connecting piece 16, while the outer passage 26 opens outward into an end region, radially adjacent to the inner connecting piece 16, of the outer connecting piece 18. The connector body 2 is formed in its interior such that the first and second connections 4 and 6 merge separately from one another into the inner and outer passages 24 and 26, respectively, of the third connection 8. In physical terms, in the illustrated exemplary embodiments, the first connection 4 merges into the inner passage 24, while the second connection 6 is connected to the outer passage 26.

Here, the functional medium whose temperature is to be controlled is preferably supplied or discharged via the first connection 4, such that said functional medium flows through the duct 12*a* of the inner line 12. A temperature control medium, in particular engine coolant, is supplied or discharged via the second connection 6, such that said temperature control medium flows through the annular duct 14*a* between the inner line 12 and outer line 14. The temperature control medium accordingly forms a jacket for the functional medium. In this way, optimum temperature control of the functional medium within the inner line 12, and effective protection against low ambient temperatures, are provided.

In the preferred embodiments illustrated, the first connection 4 and the second connection 6 are formed as constituent parts of plug systems for the fast and releasable plugged connection of the respective line, specifically in particular in each case as a receptacle 28 with holding means 30 (see FIGS. 4 and 5) for a line-side plug part (not illustrated) to be plugged in. Furthermore, seal elements 32 may be arranged within the receptacle 28.

Each connection 4, 6 and 8 has a connection axis 4*a*, 6*a*, 8*a*, with it being possible for the connections 4, 6 and 8 to be arranged and configured in practically any desired manner with regard to the relative alignment of their connection axes. In the embodiment according to FIGS. 1 to 3, for example, the connection axis 4*a* of the first connection 4 runs perpendicular to the two connection axes 6*a* and 8*a* of the second and third connections 6 and 8. The second and third connections 6 and 8 may be arranged coaxially, that is to say with axes 6*a* and 8*a* which merge flush into one another. In the illustrated embodiment, however, the two connector axes 6*a* and 8*a* are offset slightly and are parallel.

In the embodiment according to FIG. 4, firstly the first and second connections 4 and 6 are arranged at right angles with respect to one another with regard to their connection axes. Furthermore, the first and third connections 4 and 8 are also aligned at right angles to one another. The second connection 6 is arranged parallel and offset with respect to the third connection 8.

Finally, in the exemplary embodiment according to FIG. 5, the first connection 4 merges coaxially into the third connection 8, while the second connection 6 is aligned with its connection axis 6*a* perpendicular to the axes 4*a* and 8*a*.

Certain design features of the individual embodiments will be explained below.

In the embodiment according to FIGS. 1 to 3, the connector body 2 is formed as a substantially single-piece molded part, in particular from a plastic material but if appropriate also from metal. This can be seen in particular from the sectional view in FIG. 1. Here, the outer passage 26, which adjoins the receptacle 28 of the second connection 6 in the direction of the third connection 8, is formed as an eccentric duct with an approximately sickle-shaped cross section, in this regard, see in particular FIGS. 2 and 3. Said design has the advantage that the connector body 2 can be of massive design, and therefore very stable, in a region diametrically opposite the outer passage 26 (see FIG. 1), which also ensures high stability in the region of the third connection 8, and in particular of the inner connecting piece 16, for absorbing lateral forces exerted via the respective line. It is also advantageous that, as a result of the eccentric arrangement of the duct of the passage 26, at least one further connection may easily be provided as a transverse branch for the functional medium in a region situated outside the duct in the circumferential direction, without said further connection having to intersect the passage 26 or the eccentric duct. The inner passage 24 is designed as an axial duct which merges at right angles into the first connection 4 and the receptacle 28 thereof.

In the exemplary embodiments according to FIGS. 4 and 5, the connector body 2 is composed of originally a plurality of (at least two) parts which are joined together in particular cohesively. The connector body 2 is thus composed of an outer connector housing 34 and (at least) one insert part 36 (FIG. 4) or (at least) two insert parts 36 and 38 (FIG. 5). That is, in FIG. 4, an inner part 38' is analogous in function, but not in construction, to the second insert part 38 (seen in FIG. 5). The inner part 38' of FIG. 4 is formed in one piece with the outer connector housing 34, whereas in FIG. 5 the second insert part 38 is formed separately from the outer connector housing 34. One or both of the insert part 36 and 38 is cohesively connected at least in regions to the connector housing 34. The first insert part 36 preferably forms the first connection 4 and is inserted into the connector housing 34 in such a way as to be circumferentially surrounded by an annular chamber 40. The second connection 6 opens out into the annular chamber 40, with the annular chamber 40 being connected to the outer line 14 by a plurality of ducts 42, which forms the outer passage 26. Here, the ducts 42/outer passage 26 are constituent parts of either the inner part 38'/connector housing 34 in the embodiment of FIG. 4, which is formed as a single piece, or of the second insert part 38 in the embodiment of FIG. 5. The first insert part 36 may be plugged in axially, that is to say in the direction of the connection axis 4*a*, and then sealingly connected to the connector housing 34 in a circumferential region 44 in a cohesive manner, in particular by means of laser welding. This also applies to the embodiment according to FIG. 5. In FIG. 5, it is also possible for the second insert part 38 to be plugged axially into the connector housing 34. Here, the two insert parts 36 and 38 are plugged together and connected in said region 46 either likewise in a cohesive manner, in particular by means of laser welding, or by means of a seal (0 ring). The second connection 6 or the receptacle part thereof with the receptacle 28 is preferably formed in one piece with the connector housing 34.

The invention is not restricted to the illustrated and described exemplary embodiments, but rather also encompasses all equivalent embodiments within the context of the invention. Furthermore, the invention has up to now also not been restricted to the combination of features defined in the respective independent claim, but rather may also be defined by any desired other combination of certain features of all the individual features disclosed overall. This means that basically practically any individual feature of the respective independent claim may be omitted or replaced with at least one individual feature disclosed at some other point of the application. In this respect, the claims are to be understood merely as a first attempted formulation for an invention.

The invention claimed is:

1. A line connector having two mutually separate flow paths for two fluid media, one flow path for a functional medium in the form of a urea-water solution in an SCR catalytic converter system of a motor vehicle, and another flow path for a temperature control medium for controlling the temperature of the functional medium, the line connector adapted to be connected to a double line which is composed of an inner line and an outer line substantially coaxially surrounding the inner line, the line connector comprising:

a connector body having three line connections, a first connection for a first line which conducts the functional medium, a second connection for a second line which conducts the temperature control medium, and a third connection, in the form of a double connection for connecting with the double line, the third connection having an inner connecting element with an inner passage for communicating with the inner line and an outer connecting element with an outer passage for communicating with the outer line, and with the connector body being formed in its interior such that the first and second connections merge separately from one another into the inner and outer passages, respectively, of the third connection, the connector body being formed of two pieces including a connector housing and an insert piece cohesively connected together, the insert piece being circumferentially surrounded by the connector housing to define an annular chamber circumferentially around the insert piece into which the second connection opens, the inner connecting element having a first end defining a receptacle configured to receive the inner line within the inner connecting element, the inner line adapted to be cohesively connected to the inner connecting element; and said inner connecting element also including a second end which is plugged together with said insert piece, whereby said annular chamber being connected to the outer line by a plurality of ducts which forms said outer passage, whereby said plurality of ducts and said outer passage are constituent parts of said connector housing and the second end of the inner connecting element being formed in one piece with the connector housing in the region of said ducts and said outer passage.

2. The line connector as claimed in claim 1, further comprising in that the third connection is in the form of a coaxial double connecting piece including the inner connecting element and the outer connecting element, with the inner connecting element extending axially beyond the outer connecting element with a certain projecting length (X).

3. The line connector as claimed in claim 2, wherein it being possible for the inner line to be fastened to the inner connecting element by means of laser welding, for which purpose the inner connecting element is formed from a laser-transparent material in the region of the receptacle.

4. The line connector as claimed in claim 1, further comprising in that the first connection and the second connection are designed as a plug-in system for the fast and releasable plugged connection of respective lines.

5. The line connector assembly as claimed in claim 1, wherein the insert piece forms a part of the first connection.

6. A line connector assembly having two mutually separate flow paths for two fluid media, one flow path for a functional medium in the form of a urea-water solution in an SCR catalytic converter system of a motor vehicle, and another flow path for a temperature control medium for controlling the temperature of the functional medium, the assembly comprising;

a connector body having three line connections, a first connection for a first line which conducts the functional medium, a second connection for a second line which conducts the temperature control medium, and a third connection, in the form of a double connection, the third connection having an inner connecting element with an inner passage and an outer connecting element with an outer passage, and with the connector body being formed in its interior such that the first and second connections merge separately from one another into the inner and outer passages, respectively, of the third connection, the connector body being formed of two pieces including a connector housing and an insert piece cohesively connected to one another, the insert piece being circumferentially surrounded by the connector housing to define an annular chamber circumferentially around the insert piece into which the second connection opens, said inner connecting element having a second end plugged together with said insert piece, whereby said annular chamber being connected to an outer line by a plurality of ducts defined between the inner and outer connecting elements and which forms said outer passage, whereby said plurality of ducts and said outer passage are constituent parts of said connector housing and the second end of the inner connecting element being formed in one piece with the connector housing in the region of said plurality of ducts and said outer passage; and a double line which is composed of an inner line communicating with the inner passage and the outer line communicating with the outer passage substantially coaxially surrounding the inner line, the inner connecting element having a first end defining a receptacle within which the inner line is received and cohesively connected thereto.

7. The line connector assembly as claimed in claim 6, further comprising in that the first line which conducts the functional medium whose temperature is to be controlled is connected to the first connection of the line connector, while the second line which conducts the temperature control medium is connected to the second connection of the line connector.

8. The line connector assembly as claimed in claim 6, wherein the insert piece forms a part of the first connection.

* * * * *